(12) United States Patent
Wachter

(10) Patent No.: US 9,572,124 B2
(45) Date of Patent: Feb. 14, 2017

(54) D-SLP SERVICE AREA DETECTION USING AREA ID

(71) Applicant: QUALCOMM Incorporated, San Diego, CA (US)

(72) Inventor: Andreas Klaus Wachter, Menlo Park, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 398 days.

(21) Appl. No.: 13/793,021

(22) Filed: Mar. 11, 2013

(65) Prior Publication Data

US 2013/0344887 A1     Dec. 26, 2013

Related U.S. Application Data

(60) Provisional application No. 61/662,310, filed on Jun. 20, 2012.

(51) Int. Cl.
  *H04W 64/00*    (2009.01)
  *H04W 4/02*     (2009.01)
  *H04W 80/08*    (2009.01)

(52) U.S. Cl.
  CPC ............. *H04W 64/00* (2013.01); *H04W 4/021* (2013.01); *H04W 80/085* (2013.01)

(58) Field of Classification Search
  CPC .............................. H04W 64/00; H04W 4/021
  USPC ...................................................... 455/456.1
  See application file for complete search history.

(56) References Cited

U.S. PATENT DOCUMENTS

| 7,181,211 | B1* | 2/2007 | Phan-Anh | H04W 8/18 |
| | | | | 370/252 |
| 2004/0104841 | A1* | 6/2004 | Syrjarinne | G01S 5/0252 |
| | | | | 342/357.25 |
| 2007/0082682 | A1* | 4/2007 | Kim | H04W 64/00 |
| | | | | 455/456.1 |
| 2007/0178913 | A1* | 8/2007 | Niemenmaa | H04W 64/00 |
| | | | | 455/456.4 |
| 2007/0182547 | A1* | 8/2007 | Wachter et al. | 340/539.13 |
| 2007/0238458 | A1 | 10/2007 | Shim | |

(Continued)

OTHER PUBLICATIONS

Edge S., et al., "SUPL3.0 TS D-SLP and E-SLP Revisions", Open Mobile Alliance (OMA), Jun. 28, 2011 (Jun. 28, 2011), pp. 1-237.

(Continued)

*Primary Examiner* — Qun Shen
(74) *Attorney, Agent, or Firm* — Kilpatrick Townsend & Stockton LLP

(57) ABSTRACT

A method for determining whether a terminal is located inside a discovered Secure User Plane Location Platform (D-SLP) service area is disclosed. The method may comprise identifying a discovered Secure User Plane Location Platform (D-SLP). A terminal may receive from a home Secure User Plane Location Platform (H-SLP) an authorization to use the D-SLP. Additionally, the terminal may receive from the H-SLP a list of Area IDs within a Secure User Plane Location Platform (SLP) service area comprises a first group of Area IDs within the SLP service area. The method may comprise comparing an ID associated with a network access point for the terminal, and the list of Area IDs to determine if the terminal is inside the D-SLP service area. The method may comprise making a D-SLP use determination based on the comparison.

34 Claims, 10 Drawing Sheets

(56) References Cited

U.S. PATENT DOCUMENTS

| | | | |
|---|---|---|---|
| 2007/0243885 A1* | 10/2007 | Shim | H04W 4/02 455/456.2 |
| 2007/0286212 A1* | 12/2007 | Kim et al. | 370/398 |
| 2008/0227465 A1* | 9/2008 | Wachter et al. | 455/456.1 |
| 2009/0181698 A1* | 7/2009 | Farmer | H04W 4/02 455/456.3 |
| 2010/0177711 A1* | 7/2010 | Gum | H04W 88/06 370/329 |
| 2010/0273479 A1* | 10/2010 | Shim | G01S 5/0054 455/432.1 |
| 2010/0311439 A1* | 12/2010 | Thomson | G01S 5/0205 455/456.1 |
| 2010/0316006 A1* | 12/2010 | Thomson | H04W 4/02 370/329 |
| 2011/0022710 A1 | 1/2011 | Choi | |
| 2011/0045827 A1* | 2/2011 | Choi | 455/432.1 |
| 2011/0171969 A1 | 7/2011 | Halivaara et al. | |
| 2011/0287779 A1* | 11/2011 | Harper | G01S 19/03 455/456.1 |
| 2012/0040687 A1* | 2/2012 | Siomina | G01S 5/0205 455/456.1 |
| 2012/0142343 A1* | 6/2012 | Wohld | H04W 72/02 455/432.1 |
| 2012/0202517 A1 | 8/2012 | Edge et al. | |
| 2012/0270542 A1 | 10/2012 | Shim | |
| 2014/0226630 A1* | 8/2014 | Comstock | H04W 16/14 370/331 |

OTHER PUBLICATIONS

International Search Report and Written Opinion—PCT/US2013/045669—ISA/EPO—Dec. 9, 2013.

Qualcomm R01: Clarify H-SLP Control Over D-SLP Discovery: "SUPL 3.0 Discovered SLP (D-SLP)", Open Mobile Alliance (OMA),Mar. 10, 2011 (Mar. 10, 2011), pp. 1-10.

* cited by examiner

D-SLP SERVICE AREA DETECTION USING AREA ID

CROSS-REFERENCE TO RELATED APPLICATION

The present application is a non-provisional of and claims the benefit and priority under 35 U.S.C. 119(e) of U.S. Provisional App. No. 61/662,310, filed Jun. 20, 2012, entitled D-SLP Service Area Detection Using Area ID, the entire contents of which are incorporated herein by reference for all purposes.

BACKGROUND

Aspects of the disclosure relate to location-based services for mobile wireless devices. In particular, various aspects of the disclosure relate to Secure User Plan Location (SUPL) technology.

Location services for mobile wireless devices enable the current location and optionally speed and heading of a mobile wireless device to be obtained and provided to the wireless device (e.g., to an application running on the wireless device or to the user of the wireless device) or to some third party. Examples of a third party may include an emergency services provider (e.g., in the case of an emergency call from the wireless device) or some external provider of commercial services that depend on knowing the current or previous location of the wireless device. For wireless devices that may access different types of wireless communication networks, location services may be supported using a location server that can be accessed from and, in some cases, may be resident within the wireless network currently being accessed by the wireless terminal. The role of the location server may be (i) to assist the wireless terminal to make appropriate location related measurements (e.g., measurements of radio signals from base stations in the serving wireless network or measurements of various global navigation satellites) and, in some cases, (ii) to compute the location of the wireless terminal based on these measurements. The location server may also be used to relay a wireless device's location to entities authorized to receive the location and convey the wireless device's location to the wireless device in the event that the location server, rather than wireless device, had computed the location.

Current user plane location services, such as the Secure User Plane Location (SUPL) service defined by the Open Mobile Alliance (OMA), derive their security from mutual authentication between a target mobile device (e.g., a SUPL Enabled Terminal (SET)) and a location server (e.g., a SUPL Location Platform (SLP)) in which each party verifies the identity of the other party in a fully reliable manner.

A home location server (e.g., a Home SLP (H-SLP) in the case of SUPL) is a location server permanently affiliated with a number of target devices (e.g., based on service subscription). A home location server would sometimes belong to a home network operator of the target device, in the case of mobile wireless devices. A location server without a pre-provisioned permanent affiliation with a set of target devices may be referred to as a discovered location server.

In the case of SUPL, a discovered location server is referred to as a Discovered SLP (D-SLP). A discovered location server can be found by, or provided to, a target device based on its current location, currently used access network(s) and/or the current date and time and could belong to or be associated with, a non-home network operator or some other non-operator provider of location services. A Discovered SLP (D-SLP) is an SLP able to provide service to a SET in areas where the H-SLP is unable to provide service or unable to provide service at the requested quality of service (e.g., accuracy, time to fix).

In some instance (i.e., certain locations or environments), a H-SLP may not be able to adequately aid the SET in positioning (e.g., provide appropriate assistance data, perform positioning calculation, etc.). In these instances, a D-SLP may have a better ability than the H-SLP to aid the SET in positioning (e.g., provide appropriate assistance data, perform positioning calculation, etc.). In such instances a D-SLP may be used to provide unproved (e.g., localized) location service to a SET. A H-SLP may negotiate with a D-SLP to allow a SET to have access to the D-SLP. When a SET discovers a D-SLP, the SET may query its H-SLP for access rights to that D-SLP through an authorization process.

After D-SLP Authorization by an H-SLP, a SET may only be allowed to access the D-SLP while within the D-SLP service area. To this end, the SET needs to be able to determine whether it is inside or outside the D-SLP service area. This requires the SET to continuously monitor its position relative to the D-SLP service area by using high accuracy positioning methods. This continuous monitoring typically increases the power consumption of the SET and may more quickly drain the battery of the SET. Therefore, the continuous monitoring using precise positioning can reduce standby and usage time.

SUMMARY

A system and method for efficiently identifying whether the location of a target mobile device (e.g., SET) is within the service area of a location server (e.g., (D-SLP), thereby lowering the need for engaging in power consuming high accuracy position fixes by the target mobile device (e.g., SET).

In particular, certain elements of location services consume significant amounts of power, and embodiments of the present innovation limit use of certain of these elements in order to reduce power consumption and extend the operational life of devices that implement location.

According to some embodiments, the SET can be relieved from constantly determining its position using power intensive precise positioning methods (e.g., Assisted-GNSS) by using Area IDs. Area IDs can cover an appropriate area with reference to the service area of the D-SLP. Once Area IDs have been established for the service area of the D-SLP and communicated to the SET, the SET can determine whether it is active or idle on a particular radio network access point of these Area IDs. In some instances, a network access point can be referred as a cell/sector/access point. Using the Area IDs, the SET can determine whether it is currently located inside or outside the D-SLP service area. Based on the determination, the SET can engage in or refrain from power consuming positioning determination. Therefore, an Area ID method can be used by a SET instead of using a precise positioning determination (e.g., using GPS) to determine whether it is inside the D-SLP service area.

According to some embodiments, a method for determining whether a terminal is located inside a discovered Secure User Plane Location Platform (D-SLP) service area is disclosed. The method may comprise identifying a discovered Secure User Plane Location Platform (D-SLP). A terminal may receive from a home Secure User Plane Location Platform (H-SLP) an authorization to use the D-SLP. Additionally, the terminal may receive from the H-SLP a list of Area IDs within a Discovered Secure User Plane Location Platform (D-SLP) service area comprising a first group of Area IDs within the D-SLP service area. The method may comprise comparing an ID associated with a network access point for the terminal, and the list of Area IDs to determine if the terminal is inside the D-SLP service area. The method may comprise making a D-SLP use determination based on the comparison.

According to another embodiment, a terminal may comprise: one or more processors; and memory storing computer-readable instructions that, when executed by the one or more processors, cause the terminal to: identify a D-SLP; receive, at the terminal, from a home Secure User Plane Location Platform (H-SLP) an authorization to use the D-SLP; receive at the terminal from the H-SLP, a list of Area IDs within a Secure User Plane Location Platform (SLP) service area comprising a first group of Area IDs within the SLP service area; compare an ID associated with a network access point for the terminal, and the list of Area IDs to determine if the terminal is inside the D-SLP; and make a D-SLP use determination based on the comparison.

According to another embodiment, one or more computer-readable media storing computer-executable instructions for determining whether a terminal is located inside a discovered Secure User Plane Location Platform (D-SLP) service area is disclosed. When executed, it may cause one or more computing devices included in the terminal to: identify a D-SLP; receive, at the terminal, from a home Secure User Plane Location Platform (H-SLP) an authorization to use the D-SLP; receive at the terminal from the H-SLP, a list of Area IDs within a Secure User Plane Location Platform (SLP) service area comprising a first group of Area IDs with the SLP service area; compare an ID associated with a network access point for the terminal, and the list of Area IDs to determine if the terminal is inside the D-SLP service area; and make a D-SLP use determination based on the comparison.

According to another embodiment, an apparatus for determining whether a terminal is located inside a discovered Secure User Plane Location Platform (D-SLP) service area is disclosed. The apparatus may comprise: a means for identifying a D-SLP; a means for receiving, at the terminal, from a home Secure User Plane Location Platform (H-SLP) an authorization to use the D-SLP; a means for receiving at the terminal from the H-SLP, a list of Area IDs within a Secure User Plane Location Platform (SLP) service area comprising a first group of Area IDs within the SLP service area; a means for comparing an ID associated with a network access point for the terminal, and the list of Area IDs to determine if the terminal is inside the D-SLP service area; and a means for making a D-SLP use determination based on the comparison.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
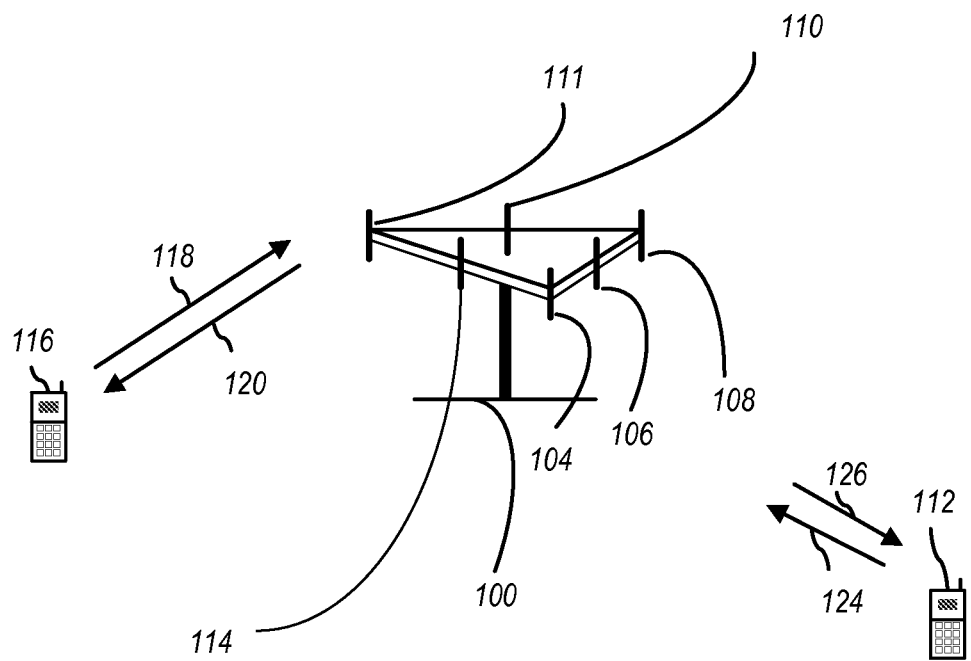
FIG. 1A, illustrates a multiple access wireless communication system, according to some embodiments.

The following invention relates to locating services. Various embodiments related to improved methods of implementing location services. In particular, certain elements of assisted location services consume significant amounts of power, and embodiments of the present invention can limit use of some of these elements in order to reduce power consumption and extend the operational life of devices that implement assisted location.

Definitions will now be provided for certain terms related to embodiments of the present innovations. Secure User Plane Location (SUPL) is an internet protocol (IP) based standard for position location using positioning technologies such as global navigation satellite system (A-GNSS), observed time difference of arrival (OTDOA), enhanced cell ID (E-CID), advanced forward link trilateration (AFLT), or any other locating system over IP (i.e. user plane). An SLP is a SUPL Location Platform, which may essentially be a computing system to provide assistance data to a SUPL Enabled Terminal (SET) and positioning calculation capabilities (using positioning measurements performed by the SET and sent to the SLP) in order to determine the location of a SET. A SET is a device that supports SUPL capabilities i.e., that may be located using a SUPL system. A Home SLP (H-SLP) is the SLP that is directly associated with, and primarily responsible for, providing services to a particular SET. A Discovered SLP (D-SLP) is an SLP able to provide service to a SET in areas where the H-SLP is unable to provide service or unable to provide service at the requested quality of service (e.g., accuracy, time to fix). Further details and description for each of these terms will be provided along with additional details related to various embodiments of the presented innovations.

The techniques described herein may be used for mobile device or client access to various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single- Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes WCDMA-FDD, WCDMA-TDD and UTRA-TDD LCR. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA is part of Universal Mobile Telecommunication System (UMTS). Long Term Evolution (LTE) is a radio access technology used by E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization, is a technique. SC-FDMA may have similar performance and overall complexity as those of OFDMA system. An SC-FDMA signal may have lower peak-to-average power ratio (PAPR) because of its inherent single carrier structure. SC-FDMA has drawn great attention, especially in the uplink communications where lower PAPR greatly benefits the mobile terminal in icons of transmit power efficiency. It is currently a working assumption for the uplink multiple access scheme in 3GPP Long Term Evolution (LTE), or Evolved UTRA.

Various embodiments are described herein in connection with a mobile device, an access terminal or SET. A SET can be any SUPL Enabled Terminal (e.g., mobile device, access terminal, game console, PDA, tablet, laptop computer). A SET can also be called a system, subscriber unit, subscriber station, mobile station, mobile, remote station, remote terminal, mobile device, user terminal, terminal, mobile terminal, wireless device, wireless terminal, wireless communication device, user agent, user device, or user equipment (UE). A mobile device, access terminal or SET can be a cellular telephone, a cordless telephone, a Session Initiation Protocol (SIP) phone, a wireless local loop (WLL) station, a personal digital assistant (PDA), a handheld device having wireless connection capability, a computing device, a laptop, a tablet or other processing device connected to or containing a modem, for example a wireless modem. Moreover, various embodiments are described herein in connection with a base station. A base station can be utilized for communicating with access terminal(s) and can also be referred to as an access point, Node B, Evolved Node B (eNodeB), access point base station, a WiFi access point, a Femtocell, home base station, home Node B, home eNodeB or some other terminology.

I. Wireless Communication System

Referring to FIG. 1A, a multiple access wireless communication system according to some embodiments is illustrated. A network access point (AP) 100 includes multiple antenna groups, one including 104 and 106, another including 108 and 110, and an additional one including 111 and 114. In some instances, a network AP 100 can include all forms of wireless network access. In FIG. 1A, only two antennas are shown for each antenna group, however, more or fewer antennas may be utilized for each antenna group. An access terminal, such as a SET 116, is in communication with antennas 111 and 114, where antennas 111 and 114 transmit information to the access terminal (e.g., SET 116) over forward link 120 and receive information from access terminal (e.g., SET 116) over reverse link 118. Another access terminal (e.g., SET 112) is in communication with antennas 106 and 108, where antennas 106 and 108 transmit information to access terminal (e.g., SET 112) over forward link 126 and receive information from access terminal (e.g., SET 112) over reverse link 124. In a Frequency Division Duplex (FDD) system, communication links 118, 120, 124 and 126 may use a different frequency for communication. For example, forward link 120 may use a different frequency than that used by reverse link 118.

The system in FIG. 1A may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot data, overhead information, data, etc.

Each group of antennas and/or the area in which they are designed to communicate may be referred to as a sector of the access point. In the embodiment, antenna groups are each designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals. Also, an access point using beamforming to transmit to access terminals scattered randomly through its coverage may cause less interference to access terminals in neighboring cells than an access point transmitting through a single antenna to all its access terminals. In some embodiments, beamforming is not performed.

Other access points or transmitting stations may be employed. For example, a base station may be used in addition to or instead of the AP 100. In some embodiments, a first transmitter such as the AP 100 may provide access to a first network while a second transmitter, for example, a cellular base station, may provide access to a second network. In some embodiments, the areas in which each of the first transmitter and second transmitter may be accessed overlap.

Figure 1B:
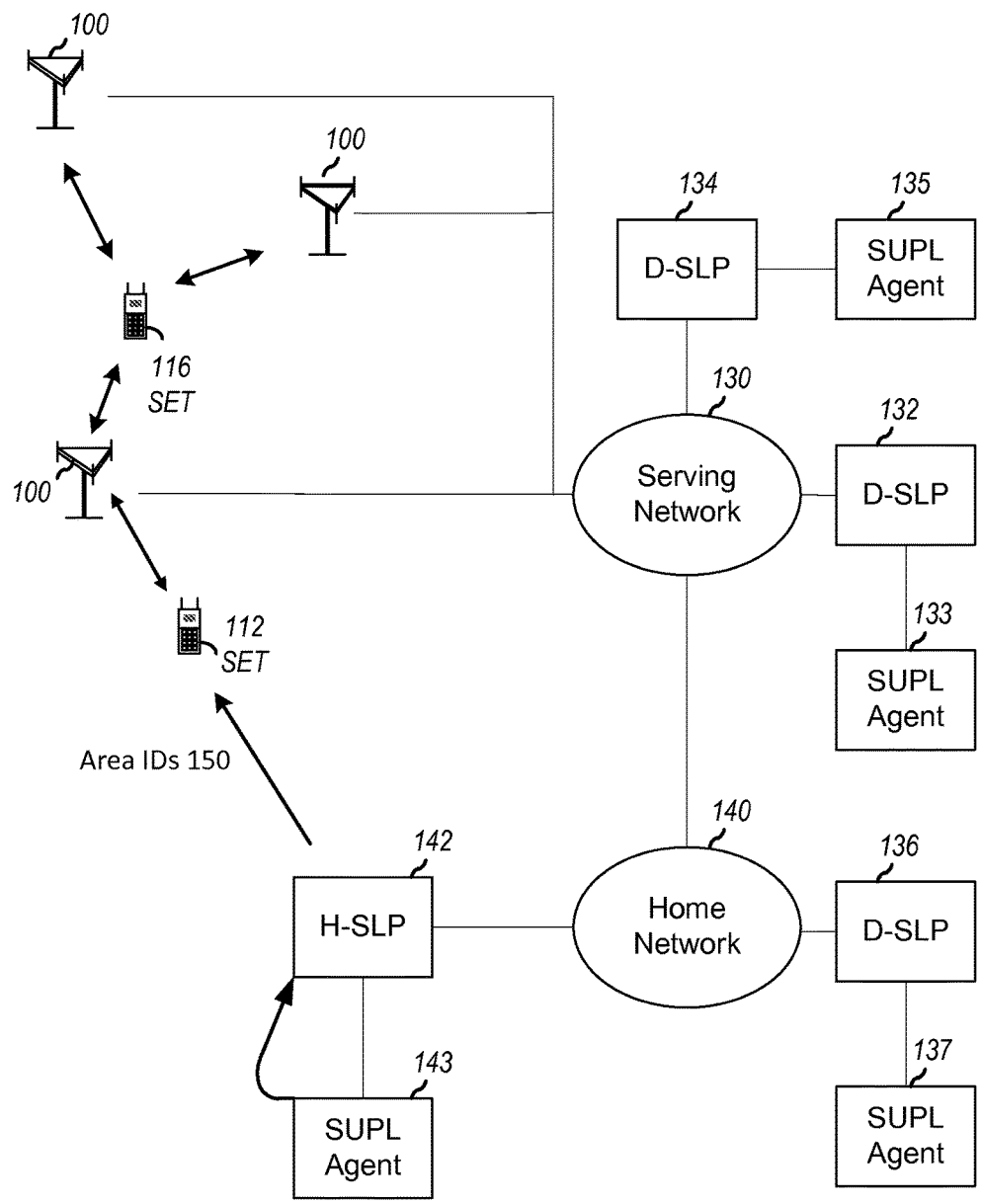
FIG. 1B illustrates one or more SETs accessing one or more base stations and access points, according to some embodiments.

FIG. 1B illustrates one or more SETs accessing one or more base stations and access points. For example a SET 116 can access some APs and base stations. The base stations and access points can be connected to a serving network 130 (e.g., a WCDMA, LTE or cdma2000 serving network). Additionally, the serving network 130 can be connected to a home network 140 either directly or via intermediate entities and systems such as the Internet. In some cases, serving network 130 and home network 140 may be the same network. In this example D-SLP 132 and D-SLP 134 can be connected to or can be part of the serving network 130. Additionally, a H-SLP 142 can be connected to, or can be part of, the home network 140.

According to some embodiments, a SUPL Agent 133, 135, 143, also known as an External Client, can be connected to each SLP 132, 134, 142, respectively. For example, a SUPL Agent 143 can request the location of a SET 112 from its associated SLP (i.e., H-SLP 142), and the SLP (i.e., H-SLP 142) can then instigate a SUPL session with the SET 112 to obtain the location. Furthermore, in the Area ID method example, a Area ID 150 can be carried in a SUPL message from H-SLP 142 to a SET such as SET 112, as further illustrated in FIGS. 4A-B.

In FIG. 1B, H-SLP 142 may be the home SLP for SET 116 and SET 112. SETs 116 and 112 may then obtain location services from H-SLP 142 in some situations—e.g., when SETs 116 and 112 are each directly accessing home network 140. Such location services may be supported using the SUPL location solution defined by OMA and may include the transfer of assistance data from H-SLP 142 to SET 116 or SET 112 to enable either SET to acquire and measure radio signals from access points and base stations (such as access points 100) in the current serving network and/or from global navigation satellites (not shown in FIG. 1B) such as satellites belonging to the Global Positioning System GPS) or other systems such as the European Galileo system or Russian GLONASS system. Additional SUPL location services performed by H-SLP may include computation of a location estimate for SET 116 or 112 based on signal measurements made and provided to H-SLP 142 by SET 116 or 112. Further SUPL location services may include transfer of a location estimate obtained by H-SLP 142 to SUPL Agent 143 or to SET 116 or SET 112. In the case that SET 116 and SET 112 are accessing serving network 130 which is different to home network 140, better location services be provided using SUPL by D-SLP 132 and D-SLP 134 than by H-SLP 142. In some instances, A D-SLP 136 and SUPL Agent 137 may also be used in the home network 140 and can be used for localized location service. For example, a hospital chain may deploy their own D-SLPs since only they have detailed knowledge with their facilities and the Wi-Fi access points deployed within their facilities. A SET would however still be considered within his home network when accessing the D-SLP (e.g., access would probably be over Wi-Fi in the hospital's LAN but the user would not be in a serving network such as a roaming partner's PLMN). This may arise because D-SLPs 132 and 134 have better knowledge of serving network 130 than does H-SLP 142 (e.g., better knowledge of the locations and transmission characteristics of access points 100) and thus may be better able to (i) provide location assistance data related to acquiring and measuring radio signals from serving network 130, (ii) compute an accurate location using such measurements and/or (iii) provide assistance data to SETs 116 and 122 enabling these SETs to compute such a location by themselves. For this reason, it may be advantageous for H-SLP 142 to provide SETs 116 and 112 with information needed to access D-SLPs 132 and 134 in a secure manner. Such information may include the addresses (e.g., IP addresses or fully qualified domain names (FQDNs)) for D-SLPs 132 and 134 and an authorization to access these D-SLPs under certain conditions (e.g., at certain locations, at certain times and/or while accessing certain networks such as serving network 130).

Figure 2:
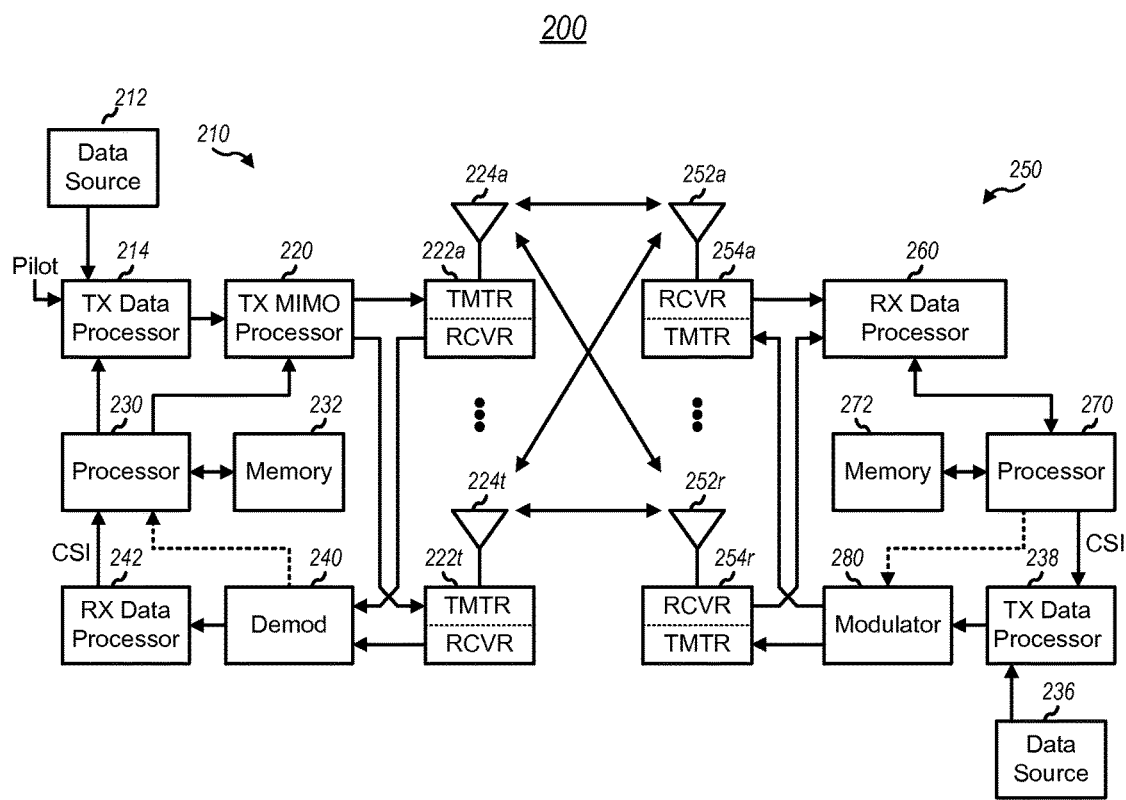
FIG. 2 is a block diagram of an embodiment of a transmitter system and a receiver system, according to some embodiments.

FIG. 2 is a block diagram of an embodiment of a transmitter system 210 (which may, for example, implement the access point 100) and a receiver system 250 (which may, for example, implement an access terminal such as the SET 112) in a MIMO system 200. It should be noted, however, that while an example MIMO system 200 is described, MIMO is not used in some embodiments, as other systems may be used (e.g., SISO, MISO, SIMO, etc.). At the transmitter system 210, traffic data for a number of data streams is provided from a data source 212 to a transmit (TX) data processor 214.

In some embodiments, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream are then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. The instructions can be stored in memory 232.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix, which can be stored in memory 272, to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210. Two or more receiver, transmitter, and antenna groups may be configured to access separate networks, for example a WLAN network and an LTE, WCDMA, or cdma2000 HPRD network. In some embodiments, a single receiver, transmitter, and antenna group may be configured to access at least two separate networks. Similarly, a plurality of processors may be included to process communications and/or data for a plurality of networks. Further, a single processor may be configured to process communications and/or data for a plurality of networks.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

II. H-SLP, D-SLP and SET

The basic function of an H-SLP is to provide service (assistance data delivery and/or position calculation) to a SET communicating over IP. In some instance (i.e., certain locations or environments), the H-SLP may not be able to adequately aid the SET in positioning (e.g., provide appropriate assistance data, perform positioning calculation, etc.). In these instances, a D-SLP may have a better ability than the H-SLP to aid the SET in positioning (e.g., provide appropriate assistance data, perform positioning calculation, etc.). In such instances a D-SLP may be used to provide improved (e.g., localized) location service to a SET. A H-SLP may negotiate with a D-SLP to allow a SET to have access to the D-SLP. When a SET discovers a D-SLP, the SET may query its H-SLP for access rights to that D-SLP through an authorization process.

The D-SLP may be operated by the same entity operating the H-SLP or it may be operated by a third party. As later illustrated in block 405 of FIG. 4A, an H-SLP may negotiate with a D-SLP to allow a SET to have access to the D-SLP as part of a business relationship between the H-SLP and the D-SLP. Furthermore, as later illustrated in block 410 of FIG. 4A, when a SET discovers a D-SLP, the SET may query its H-SLP for access rights to that D-SLP (e.g., type of service allowed, service area, service time window, etc.) through an authorization process.

Figure 5A:
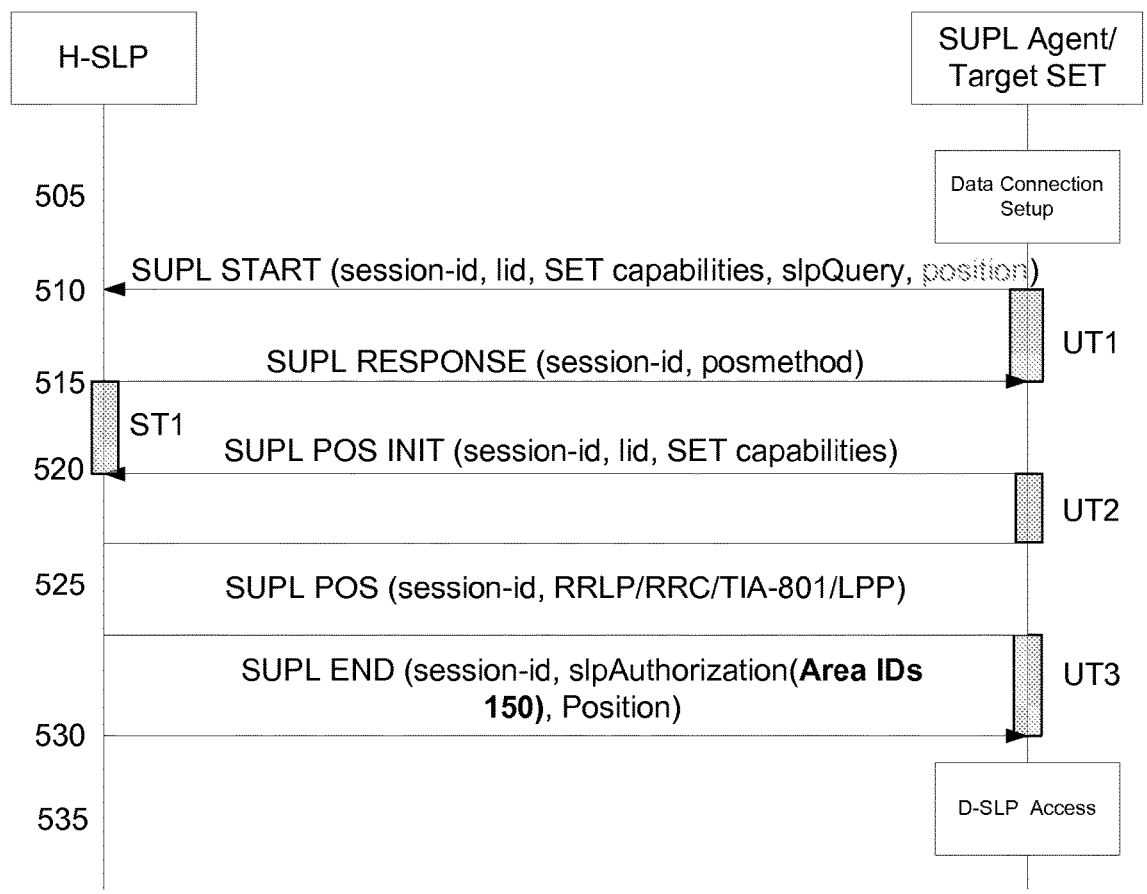
FIG. 5A illustrates a method of an H-SLP authorization of one or more D-SLP on request, according to one embodiment.
Figure 5B:
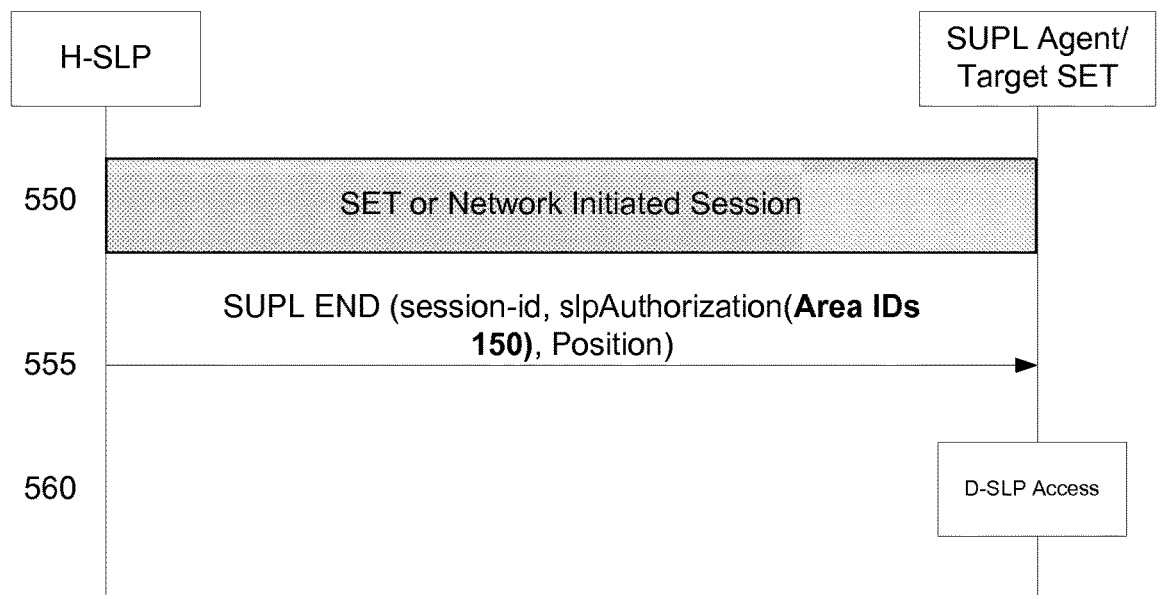
FIG. 5B illustrates a method of an unsolicited H-SLP authorization of one or more D-SLP, according to one embodiment.

Examples of D-SLP authorizations by an H-SLP are illustrated by the flow charts in FIGS. 5A and 5B.

After D-SLP authorization by an H-SLP, a SET can access the D-SLP only while within the D-SLP's service area. There may be other access criteria such as, but not limited to, time window for access. Therefore, the SET needs to determine whether it is inside or outside the service area of the D-SLP.

This may require the SET to continuously monitor its position relative to the service area of the D-SLP by using precise positioning methods (e.g., A-GNSS, OTDOA, Enhanced Cell ID). The SET may need to employ precise positioning depending on the location of the SET. For example, if the SET is 500 miles away from the D-SLP's service area, the SET will probably not continuously monitor its location using precise positioning. In fact it would probably only occasionally perform precise positioning. As the SET gets closer to the D-SLP's service area, the frequency of precise positioning can increase since the SET does not want to miss the moment that it crosses into the D-SLP's service area. This continuous monitoring can increase the power consumption of the SET. This can quickly drain the battery of the SET and therefore reduce standby and usage time.

Figure 4A:
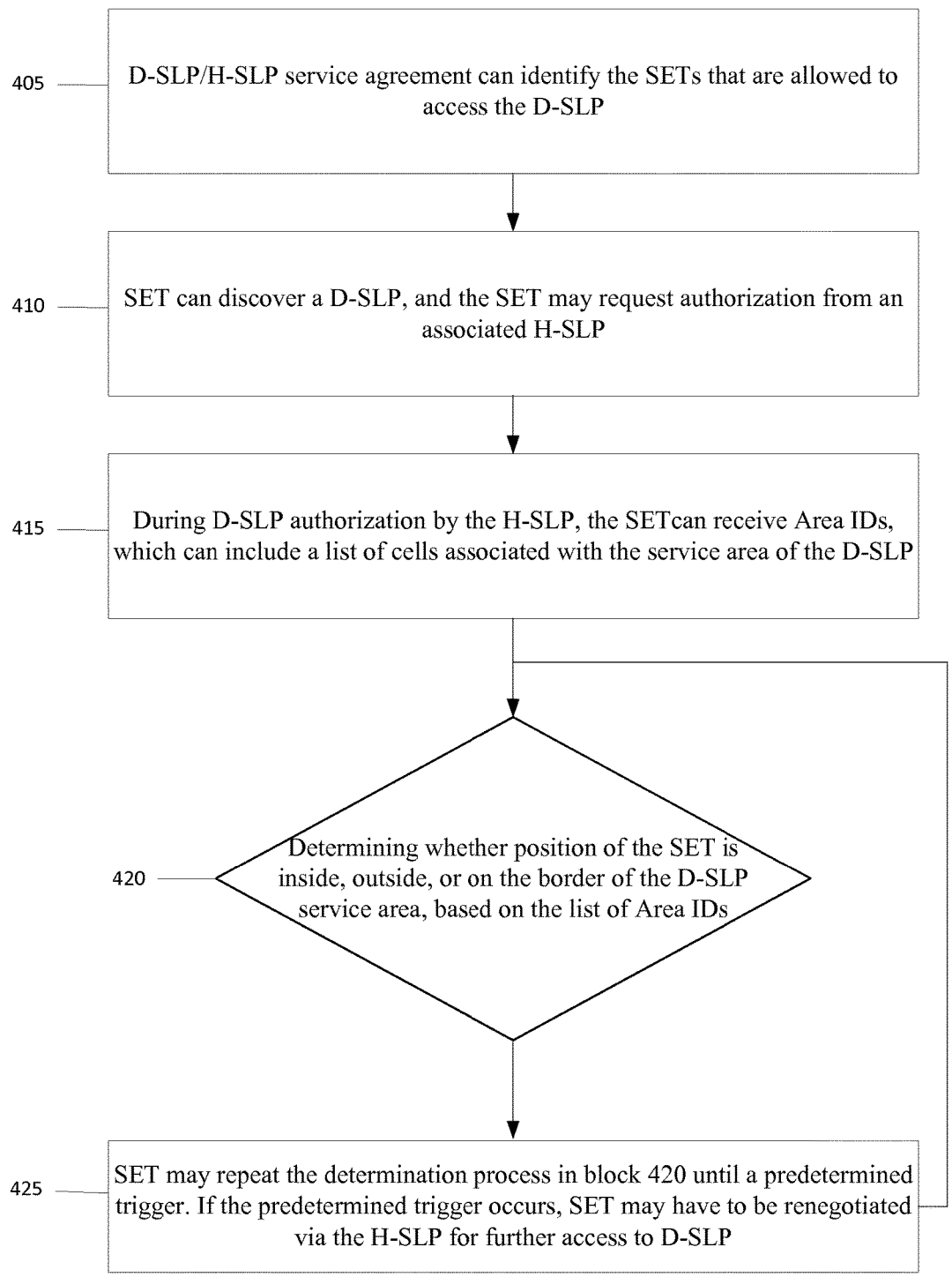
FIG. 4A is a flowchart illustrating a method using Area IDs according to some embodiments.

According to some embodiments, the SET can be relieved from constantly determining its position using power intensive precise positioning methods (e.g., Assisted-GNSS) by using Area IDs. Block 415 in FIG. 4A illustrates an example of the SET receiving Area IDs.

Using the Area ID method, the SET may not have to constantly determine its position by using power intensive precise positioning methods (e.g., A-GNSS). Block 420, 420A, 420B and 420C in FIG. 4A can be examples of this determination process.

Therefore, the Area ID method can allow a SET to abstain from power consuming precise positioning determination. Examples of the Area ID method are further illustrated in FIGS. 3, 4A, 4B, 5A, 5B and 6.

III. Area IDs

Area IDs can be sets of radio cells, sectors, and/or access points which define a geographical area based on radio coverage. Area IDs can cover an appropriate area with reference to the service area D-SLP. According to some embodiments, the SET can receive the list of Area IDs which have been established for the service area of the D-SLP. Using the received list of Area IDs, the SET can determine if it is inside the service area of the D-SLP. As previously mentioned, the SET may only be allowed to access the D-SLP while within the service area of D-SLP.

Using the list of Area IDs, a SET can determine if the SET is positioned inside or outside the service area of the D-SLP without having to use precise positioning. According to some embodiments, the list of Area IDs can include: an inside list; and a border list.

In one embodiment, if the SET is active on a cell, sector, access point ID which is included in the inside list of Area IDs, the SET can determine that it is within the D-SLP service area. In some instances, when the SET is within the D-SLP service area it may use precise positioning, but the use of precise positioning can be to answer a position request and not to determine if it is inside or outside the D-SLP service area. Alternatively, the SET can be idle (i.e., camped on) an Area ID which is included in the inside list of Area IDs, instead of the SET being active. In this instance, the SET can determine it within the D-SLP service area without being active.

In another embodiment, if the SET is active on an Area ID which is outside the D-SLP service area, the SET can determine that it is outside the D-SLP service area by determining that the Area ID is not included in the inside list or the border list. Alternatively, the SET can be idle (i.e., camped on) an Area ID which is included in the outside list of Area IDs. In this instance, the SET can still determine that it is outside the D-SLP without engaging in precise positioning.

In yet another embodiment, if the SET is active on an Area ID which is included in the border list of Area IDs, the SET can determine that it is on the border of the service area of the D-SLP service area. The SET may need to engage in precise positioning to determine whether it is inside or outside the D-SLP service area and whether it may use the service. Alternatively, the SET can be idle (i.e., camped on) an Area ID which is included in the border list of Area IDs. In this instance, the SET can determine that it is on the border of the service area of the D-SLP service area. The SET may need to engage in precise positioning to determine whether it is inside or outside the D-SLP service area and whether it may use the service.

As described in the embodiments above, a SET may not need to use precise positioning to determine if it is within the service area of the D-SLP by using the list of AREA IDs. For example, if the SET is on an Area ID that is on the inside list, the SET can easily determine whether to use the D-SLP without further precise positioning of its location. This can help the SET refrain from a power consuming positioning determination in order to determine whether it is inside or outside the D-SLP service area.

A. List of AREA IDs

Figure 3:
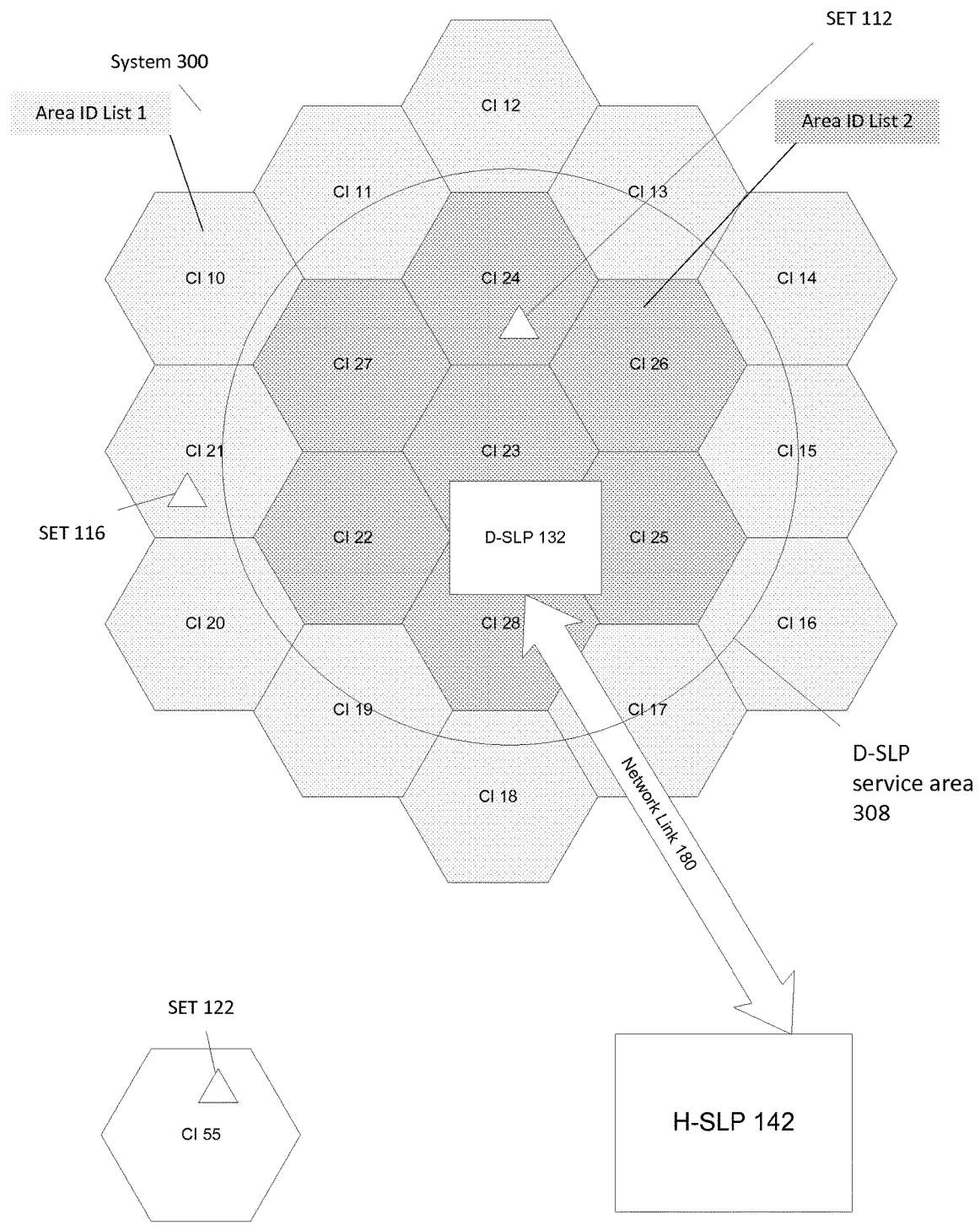
FIG. 3 is a system diagram illustrating Area IDs according to some embodiments.

FIG. 3 shows a system 300 illustrating Area IDs according to some embodiments. System 300 includes D-SLP 132 that is associated with D-SLP service area 308. System 300 further includes H-SLP 142, network link 180, Area IDs list 1, Area IDs list 2, and SETs 112, 116, and 122.

D-SLP service area 308 is shown as a circle, but may be any shape as defined by a service agreement and the characteristics of D-SLP 132. D-SLP service area 308 is illustrated in relations to Area ID list 1 and Area ID list 2. In some instances, Area ID list 2 can be completely within D-SLP service area 308, and Area ID list 1 can be on the border of D-SLP service area 308. Similarly SETs 112, 116, and 122 are shown in their respective Area IDs, but any number of SETs may be present, both within the shown areas and at any point.

For any given SET in the general area of system 300, the SET may identify D-SLP 132 and attempt to obtain authorization to access that D-SLP through the H-SLP of the SET. The H-SLP of SETs 112, 116, and 122 is H-SLP 142.

In some instances, during authorization for D-SLP 132 by the H-SLP 142, H-SLP 142 can provide a list of Area IDs for the service area of the D-SLP to SETs 112, 116, 122.

The SET can use the list of Area IDs to determine its approximate position relative to the D-SLP service area 308 without engaging in power consuming positioning determination using precise positioning methods (e.g., A-GNSS, OTDOA).

According to some embodiments, using the Area IDs, the particular SET may use the network access point (e.g., cell/sector/access point) ID it is currently active or idle (i.e., camped on) to determine that it is either: inside the D-SLP's service area; outside the D-SLP's service area; or on the border of the D-SLP's service area.

Furthermore, the Area ID method may function tot only when a SET is in active communication transmitting information to a network access point, but may also function when a SET is in idle mode (i.e., camped on) a network access point without maintaining an active connection to the network.

For example, as long as the SET is either inside or outside the D-SLP service area 308, a precise position determination is not required for the SET to determine a position relative to the D-SLP serving area 308. Thus, while a SET may not know its exact position, the SET may know whether it is inside or outside the D-SLP service area 308.

Additionally, in another example, when the Area ID method indicates that the SET is on the border of the D-SLP service area 308, the SET may be required to engage in a precise position determination in order not to miss entering or leaving of the service area of the D-SLP. As a SET moves between different network access points (e.g., cell/sector/access points), the SET may check the new network access point's IDs against the Area IDs (i.e., against the list of network access point ids provided in the Area IDs) to determine whether it needs to engage in precise positioning. The SET may need to engage in precise positioning in order to better determine whether it is inside or outside the D-SLP service area 308.

Using the Area ID method, a SET may compare the ID of a network access point with a list of Area IDs received at the SET in order to determine whether it is outside, within or on the border of D-SLP service area 308. Some examples of the Area ID method are further described in the following section with respect to SETs 112, 114 and 116.

B. AREA ID Method

In the example illustrated in FIG. 3, SETs 112, 116, and 122 may receive a list of Area IDs (e.g., Area ID list 1 and Area ID list 2). For example, during D-SLP authorization by the H-SLP, which is described in more detail in FIGS. 5A and 5B, the SET can receive Area ID list 1 and Area ID list 2. Additionally, in block 415 of FIG. 4A and in block 630 of FIG. 6, the SET can receive the list of Area IDs from the H-SLP.

SET 112 can be active or idle on Area ID 24 (e.g., network access point 24, CI 24 in FIG. 3). Furthermore, SET 112 determines that its location is within the service area of the D-SLP, based on the received list of Area IDs (e.g., Area ID list 2 is inside the D-SLP service area 308). This determination can be done without the SET having to engage in precise positioning. SET 112 may then access D-SLP 110 to obtain location service (i.e., assistance data delivery and/or position calculation).

Alternatively, SET 122 may e able to determine without engaging in active positioning that its position is outside the D-SLP service area 308. In this instance, SET 122 can be active or idle on Area ID 55 (e.g., network access point 55, CI 55 in FIG. 3). As illustrated in FIG. 3, Area ID 55 is neither on the border nor inside the D-SLP service area 308. SET 122 may therefore determine that its position is outside the D-SLP service area 308, because Area ID 55 is not part of Area ID list 1 nor Area ID list 2. Furthermore, since SET 122 is outside the D-SLP service area 308, SET 122 may not access the D-SLP to obtain location service.

Following determination logic as SET 112 and SET 122, SET 116 may be able to determine without engaging in active positioning that its position is on the border area of D-SLP service area 308. In this instance, SET 122 can be active or idle on Area ID 21 (e.g., network access point 21, CI 21 in FIG. 3). As illustrated in FIG. 3, Area ID 21 is part Area ID list 1. The SET may therefore determine that its position is on the border of the D-SLP service area 308, based on Area ID 21 being part of Area ID list 1. Furthermore, since SET 116 is on the border of the D-SLP service area 308, set 116 may use precise positioning (e.g., GPS) to determine whether or not it is within the D-SLP service area 308.

FIG. 4 illustrates a flowchart for sing the Area ID method to determine if a SET 112 is within the D-SLP service area 308, according to some embodiments.

In 405, a D-SLP/H-SLP service agreement can identify the SETs (e.g., SET 112) that are allowed to access the D-SLP 132. Furthermore, the agreement can define a service area, service time and service menu, among other pertinent information. The service area can be the D-SLP service area 308, for example. The service time can be the allowed time frame that a SET 112 can access the D-SLP 132. The service menu may define whether location services may be network initiated, set initiated, or both. The service menu may further define what types of location measurements are allowed. Location measurements can include single fix measurements, periodic triggers, or area event communications. Area event communication can include a message being sent to the SET when a boundary is crossed.

In 410, a SET (e.g., SET 112) or related system can discover a D-SLP 132, and the SET 112 may request authorization from an associated H-SLP 142. Methods of H-SLP authorizations are further described in FIGS. 5A and 5B.

Discovery of a D-SLP 132 may occur, for example, on a home computer of a user during a purchase, and with the information being transferred to the SET 112 at a later point in time. Discovery of a D-SLP 132 may further be separated in time from the authorization. For example, if a user purchases a vacation package on a home computer for a vacation occurring several months in the future, the purchase may include a communication identifying D-SLP 132 for use during the vacation. The SET 112 may be able to use the information later in time and in a different place to receive location services in that vacation place.

In 415, during D-SLP authorization by the H-SLP 142, the SET 112 can receive Area IDs 150, which includes a list of cells associated with the service area of the D-SLP 132. The association between Area IDs 150 and the D-SLP service area 308 may be created by an H-SLP 142 using a radio network database, or may be manually configured in the H-SLP 142. In other embodiments, the association between Area IDs 150 and the service area of the D-SLP 132 may be received by other sources.

Figure 4B:
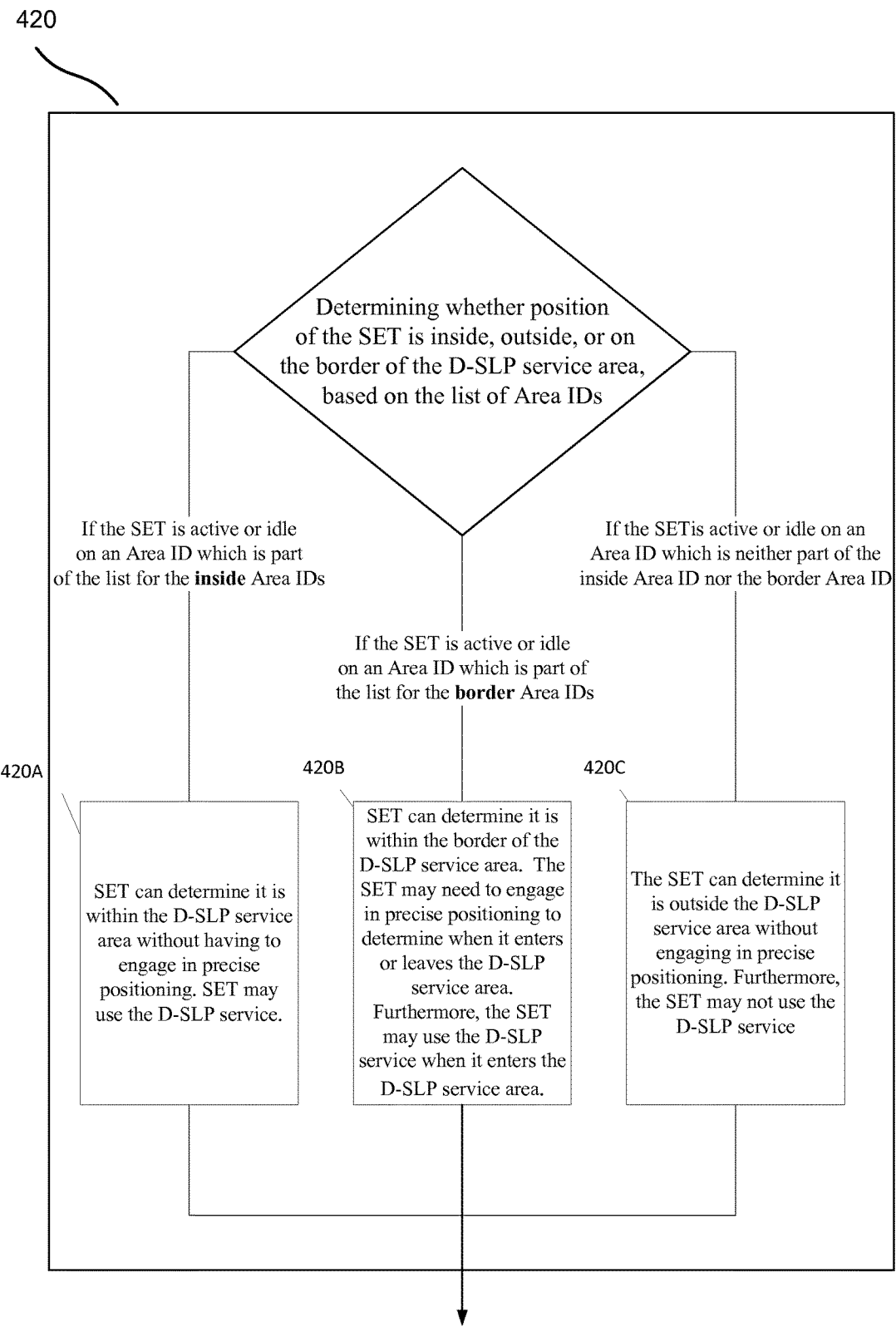
FIG. 4B is a flowchart illustrating the determination process of a method using Area IDs according to some embodiments.

In the determination block 420, the SET 112 may use the list of Area IDs 150 to determine whether it is inside, outside, or on the border of the D-SLP service area 308. FIG. 4B describes this determination in further details. Furthermore, as illustrated by the exemplary position determination of SET 112, 116, 122 in FIG. 3, a SET can determine its position in relations to the D-SLP service area 308 based on the Area IDs 150.

In 425, SET 112 may repeat the determination process in block 420 until a predetermined trigger. For example, a predetermined trigger can include when the service privileges of SET 112 with D-SLP 132 ends. Other predetermined triggers can include, but are not limited to, the end of a time period, the end of a certain use time, use of threshold number of hours, or a withdrawal of service message from an H-SLP. Furthermore, if the predetermined trigger occurs, SET 112 may have to renegotiated via the H-SLP for further access to D-SLP 132.

FIG. 4B illustrates a flowchart for the determination block 420 in FIG. 4A, according to some embodiments. As previously mentioned, in the determination block 420, a SET may use the list of Area IDs 150 to determine whether it is inside, outside, or on the border of the D-SLP service area.

Furthermore, as illustrated by the exemplary position determination of SET 112, 116, 122 in FIG. 3, a SET can determine its position in relation to the D-SLP service area 308 based on the Area IDs 150.

In 420A, if the SET 112 is active or idle (e.g., camped) on an Area ID (e.g., cell, sector, access point ID) which is part of the list for the inside Area IDs (e.g., Area ID list 2 in FIG. 3), the SET can determine it is within the D-SLP service area 308. Furthermore, precise positioning is not needed to determine whether or not the SET is inside the D-SLP service area.

In 420B, if the SET 112 is active or idle on an Area ID which is part of the list for the border Area IDs (e.g., Area ID list 1 in FIG. 3), the SET can determine it is within the border of the D-SLP service area 308. The SET 112 may need to engage in precise positioning to determine when it enters or leaves the D-SLP service area 308. Furthermore, the SET 112 may use the D-SLP service when it enters the D-SLP service area 308.

In 420C, if the SET 112 is active or idle on an Area ID which is neither part of the inside Area ID nor the border Area ID, the SET 112 can determine it is outside the D-SLP service area without engaging in precise positioning. For example, SET 122 in FIG. 3 is outside the D-SLP service area 308, because it is active on Area ID 55, which is not part of Area ID list 1 nor Area ID list 2. Furthermore, the SET may not use the D-SLP service, and does not need precise positioning for such determination.

IV. H-SLP Authorization of One or More D-SLP

A. H-SLP Authorization of One or More D-SLP (On Request)

FIG. 5A illustrates an example of D-SLP Authorization by the H-SLP requested by the SET. In some instances, the SET may have discovered one or more D-SLPs and can request the H-SLP for authorization by sending the D-SLPs to the H-SLP (e.g., slpQuery parameter in SUPL START). The H-SLP can authorize or deny the use of these D-SLP (e.g., slpAuthorization parameter in the SUPL END message).

Additionally, FIG. 5A illustrates an exemplary procedure for H-SLP authorization of one or more D-SLPs on request and provision of a list of Area IDs 150 for each D-SLP (which are carried in the final SUPL END message). For example, this procedure can be invoked by a SET 112 to obtain authorization from the H-SLP 142 for D-SLPs (e.g., D-SLP 132) discovered by the SET that can provide location services to the SET at or in the vicinity of its current location.

Alternatively, this procedure may also be invoked by a SET to obtain authorization from the H-SLP for D-SLPs discovered by the SET that provide location services at some location remote from the SET (e.g., a location that the user of the SET expects to visit at some later time). The H-SLP is not compelled to provide authorization in such cases, but may nevertheless choose to do so in order to improve location support. Additionally, there may be an arrangement between the provider of an H-SLP and the provider of a D-SLP to avoid service overload to the D-SLP. The arrangement may limit the number of SETs for which the D-SLP can be simultaneously authorized.

At 505, the SET 112 starts a procedure to eventually obtain the addresses of authorized D-SLPs (e.g., D-SLP 132) from the H-SLP 142 that are able to provide location services to the SET at or in the vicinity of its current location or, in some cases, at some remote location. The procedure may be invoked under any of the following conditions once any minimum retry period for any previous invocation of this procedure has expired:

a. The SET discovers a D-SLP address applicable to its current location or to a remote location that it would like to have authorized.

b. In the case of D-SLP authorization, the SET is unable to obtain adequate positioning service from the H-SLP and either has no currently authorized D-SLPs or has currently authorized D-SLPs, access to which is forbidden due to geographic area or access network restrictions.

In some embodiments, the procedure is invoked under a condition not described above. Additionally, the SET 112 can take appropriate action to establish a secure Transport Layer Security (TLS) connection to the H-SLP.

At 510, the SET 112 can use the default address provisioned by the Home Network 140 to establish a secure TLS connection to the H-SLP and sends a SUPL START message to start a positioning session with the H-SLP. The SUPL START message contains session-id, SET capabilities and Location ID (lid) parameters. The SET capabilities may include the supported positioning methods (e.g., SET-Assisted A-GPS, SET-Based A-GPS) and associated positioning protocols (e.g., RRLP, RRC, TIA-801 or LPP). The SUPL START message also contains an SLP Query parameter (slpQuery) indicating whether the SET requests D-SLP addresses. For a D-SLP request, the SET can include a list of any D-SLP addresses currently authorized by the H-SLP and may include a list of preferred D-SLP addresses (e.g., discovered D-SLP addresses) and/or a list of not preferred D-SLP addresses (e.g., D-SLPs the SET could not previously obtain service from). The SET can also include its current position estimate if it is available.

At 515, the H-SLP proceeds to 530 if it does not need to obtain the position of the SET or verify any position provided at 510. Otherwise, the H-SLP sends a SUPL RESPONSE message to the SET. The SUPL RESPONSE message contains the session-id, and the intended positioning method (posMethod).

At 520, the SET can send a SUPL POS INIT message to the H-SLP. The SUPL POS INIT message contains the session-id, the Location ID, SET capabilities and optionally a SUPL POS message carrying LPP and/or TIA-801 positioning protocol messages. The SET may also provide its position. If a position retrieved in, or calculated based on information received in, the SUPL POS INIT message is available that meets the required Quality of Positioning (QoP) the H-SLP may directly proceed to 530 and not engage in a SUPL POS session.

At 525, the SET and H-SLP engage in a SUPL POS message exchange to calculate a position. The H-SLP calculates the position estimate based on the received positioning measurements (i.e., SET-Assisted) or the SET calculates the position estimate based on assistance obtained from the H-SLP (i.e., SET-Based).

Once any position calculation is complete, the H-SLP determines a new set of authorized D-SLP addresses if D-SLP addresses were requested. The H-SLP sends a SUPL END message to the SET with an SLP Authorization parameter (e.g., slpAuthorization) containing a list of authorized D-SLP addresses if D-SLP addresses were requested.

The SLP Authorization parameter may include Area IDs 150 to be used in the Area ID method described herein.

Additionally, the addresses in each list are included in priority order, highest priority first, and can replace any previous list of authorized D-SLPs that the SET may have received previously from the H-SLP. For each provided D-SLP address, the H-SLP may include the service duration for which the D-SLP address can be considered valid, the service area within D-SLP may be accessed, a list of serving access networks from which the D-SLP may be accessed and a combination type that defines how the service area and access network restrictions are to be combined.

Furthermore, for any authorized D-SLP address, the H-SLP may also provide a list of services that the SET is permitted to engage in with this D-SLP and may provide a preference for accessing a D-SLP versus accessing the H-SLP for any SET initiated location request. The H-SLP may also include a list of Area IDs 150 for each authorized D-SLP. The H-SLP may also provide any position estimate computed at 525. The SET can release the TLS connection to the H-SLP and release all resources related to this session. The H-SLP can release a all resources related to this session.

At 530, once the position calculation is complete, the H-SLP can send the SUPL END message to the SET informing it that no further positioning procedure will be started and that the location session is finished. The SUPL END message can contain the list of Area IDs 150. Depending on positioning method and used positioning protocol the H-SLP may add the determined position to the SUPL END message. The SET can release the secure connection and release all resources related to this session. The H-SLP can release all resources related to this session.

At 535, the SET may subsequently access for SET initiated location services any D-SLP authorized by the H-SLP at 530 based on the following principles:
  a. D-SLPs can be accessed priority order—where a lower priority address is accessed only when all higher priority addresses are precluded by some other condition or cannot provide service.
  b. A D-SLP may only be accessed so long as any service duration for the D-SLP has not expired.
  c. A D-SLP may only be accessed if the SET satisfies any provided service area and access network restrictions.
  d. For D-SLP access, a SET may only request an authorized service.
  e. For D-SLP access, the SET can follow any preference provided for H-SLP access.
  f. If access to a D-SLP or the H-SLP fails (e.g., the SET cannot establish a secure IP connection or the D-SLP or H-SLP cannot provide the required service), a SET may access another D-SLP or the H-SLP according to the above rules.

According to some embodiments, not all the principles listed in 535 needs to be followed. For example, according to one embodiment, a SET may need to abide by one or more of the principles listed in 535. In some embodiments, one or more principles other than those listed above may be followed in addition to or instead of one or more of the principles listed above.

B. H-SLP Authorization of One or More D-SLP (Unsolicited)

FIG. 5B illustrates an example of an unsolicited D-SLP Authorization by the H-SLP. In some instances, there is no explicit request by the SET for D-SLP authorization. The H-SLP can simply use an ongoing SUPL session to send D-SLP authorization to the SET. This may be part of the SUPL END message at the end of the SUPL session. The SUPL END message can carry the slpAuthorization parameter which can include the Area IDs 150, similar to FIG. 5A.

According to some embodiments, a procedure may be invoked by the H-SLP 142 to provide authorized D-SLP 132 addresses to a SET 112 when not initially requested by SET 112 as was the case in FIG. 5A. The procedure can be applicable when a SUPL END is sent by the H-SLP 142 to normally terminate any SUPL session.

Referring to FIG. 5B, at 550, the SET and H-SLP engage in an immediate or deferred SUPL session that may be initiated by the SET or by the H-SLP.

Once the SUPL session is complete, at 555, the H-SLP determines a set of authorized D-SLP addresses which may be based on the current SET location and current access network(s) used by the SET (e.g., as obtained by the H-SLP at 550). The H-SLP 142 sends a SUPL END message to the SET 112 with an SLP Authorization parameter (slpAuthorization) containing a list of authorized D-SLP addresses.

The addresses in each list are included in priority order, highest priority first, and replace any previous list of authorized D-SLPs that the SET 112 may have received from the H-SLP 142. For each provided D-SLP address, the H-SLP 142 may include the service duration for which the D-SLP address can be considered valid, the service area within which the D-SLP address may be accessed, a list of serving access networks from which the D-SLP address may be accessed and a combination type that defines how the service area and access network restrictions are to be combined.

In the case of a provided D-SLP address, the H-SLP 142 may provide a list of services that the SET 112 is permitted to engage in with this D-SLP 132. The H-SLP 142 may also provide a preference for accessing the H-SLP versus accessing a D-SLP and/or may provide a request for notifying the H-SLP when a D-SLP is accessed. The H-SLP may also include a list of Area IDs 150 for each authorized D-SLP. The Area IDs 150 can be used by the SET 112 in the Area ID method as described herein. The SET can release the TLS connection to the H-SLP and release all resources related to the session. The H-SLP can release all resources related to the session.

At 560, the SET 116 may subsequently access any D-SLP provided by the H-SLP at 555 for SET initiated location services and/or may accept network initiated location requests from any such D-SLP. The rules for such access may be the same as those defined at 535 in FIG. 5A in the case of a D-SLP authorized by the H-SLP.

C. A Terminal Using the Area ID Method for Accessing a D-SLP

Figure 6:
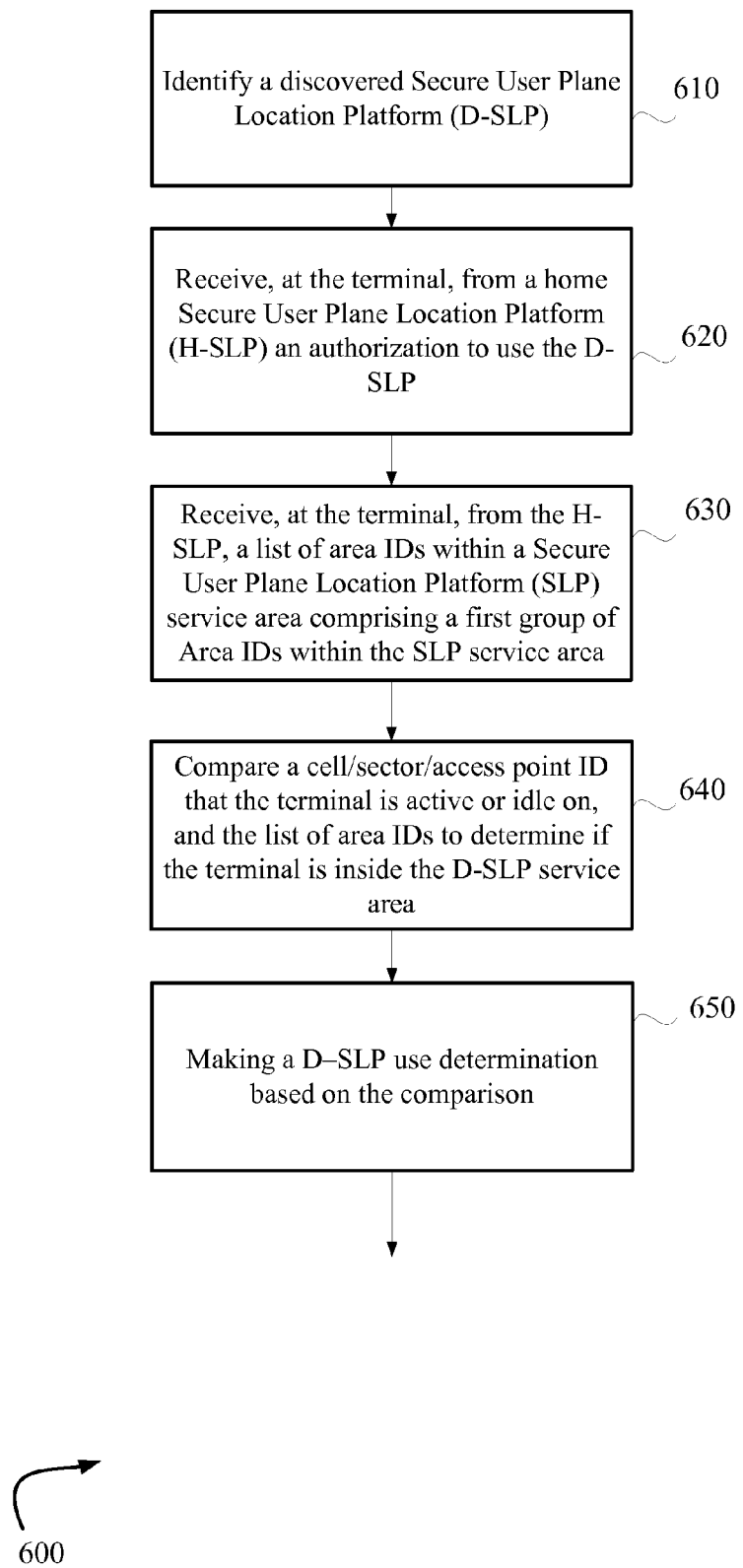
FIG. 6 illustrates an exemplary method for a terminal accessing a D-SLP using the Area ID method, according to some embodiments.

FIG. 6 illustrates an exemplary method 600 for a terminal accessing a D-SLP using the Area ID method, according to some embodiments. In some instances, the D-SLP may be D-SLP 132 or 134 in FIG. 1B and the terminal may be a SET such as SET 112, 116 or 122 in FIG. 1B.

At 610, a terminal (e.g., SET 112) can identify a D-SLP (e.g., D-SLP 132). According to another embodiment, a H-SLP (e.g., H-SLP 142) can identify a D-SLP. A D-SLP can be found by or provided to a terminal based on its current location, currently used access network(s) and/or the current date and time and could belong to or be associated with a non-home network operator or some other non-operator provider of location services. As previously described, a D-SLP is able to provide service to a terminal in areas where the H-SLP is unable to provide service or unable to provide service at the requested quality of service. A H-SLP may negotiate with a D-SLP to allow a terminal to have access to the D-SLP. When a terminal discovers a D-SLP, the terminal may query its H-SLP for access rights to that D-SLP through an authorization process.

In some embodiments, the terminal is implemented by the system 250. In such embodiments, at least portions of 610 may be performed, for example, by the transceiver 252—e.g., in combination with the modulator 280—and/or one or more of the processors 238, 260, and 270—e.g., in combination with information and/or instructions from the data source 236 and/or memory 272. In some embodiments, the D-SLP is implemented by the system 210. In such embodiments, at least portions of 610 may be performed, for example, by the transceiver 222—e.g., in combination with the demodulator 240—and/or one or more of the processors 214, 220, 230, and 242—e.g., in combination with information and/or instructions from the data source 212 and/or memory 232.

At 620, the terminal can receive from a H-SLP an authorization to use the D-SLP. Based on the D-SLP Authorization by the H-SLP, a terminal may only be allowed to access the D-SLP while within the D-SLP service area (e.g., D-SLP service area 308). Therefore, the terminal needs to be able to determine whether it is inside or outside the D-SLP service area. Current implementations require that the terminal continuously monitors its position relative to the D-SLP service area by using high accuracy precise positioning methods. Thus, current implementations increase the power consumption of the terminal, which can reduce standby and usage time. Furthermore, according to some embodiments, the terminal can determine its position relative to the D-SLP service area, without the use of precise positioning methods.

According to some embodiments, as illustrated in FIGS. 5A and 5B, the Area IDs 150 can also be received in the SUPL END message during the H-SLP authorization process.

In some embodiments, the terminal is implemented by the system 250. In such embodiments, at least portions of 620 may be performed, for example, by the transceiver 252—e.g., in combination with the modulator 280—and/or one or more of the processors 238, 260, and 270—e.g., in combination with information and/or instructions from the data source 236 and/or memory 272. In some embodiments, the H-SLP is implemented by the system 210. In such embodiments, at least portions of 620 may be performed, for example, by the transceiver 222—e.g., in combination with the demodulator 240—and/or one or more of the processors 214, 220, 230, and 242—e.g., in combination with information and/or instructions from the data source 212 and/or memory 232.

For example, at 630, the terminal can receive from the H-SLP a list of Area IDs within a SLP service area. The list of Area IDs can comprise a first group of Area IDs within the SLP service area. For example, the first group of Area IDs can be a list for all the Area IDs inside the D-SLP service area. As illustrated in FIG. 3, the first group of Area IDs can be the Area ID List 2. Area ID List 2 can be a list that includes all the Area IDs inside the D-SLP service area 308.

In some embodiments, the terminal is implemented by the system 250. In such embodiments, at least portions of 630 may be performed, for example, by the transceiver 252—e.g., in combination with the modulator 280—and/or one or more of the processors 238, 260, and 270—e.g., in combination with information and/or instructions from the data source 236 and/or memory 272. In some embodiments, the H-SLP is implemented by the system 210. In such embodiments, at least portions of 630 may be performed, for example, by the transceiver 222—e.g., in combination with the demodulator 240—and/or one or more of the processors 214, 220, 230, and 242—e.g., in combination with information and/or instructions from the data source 212 and/or memory 232.

Additionally, the SET can always know whether it is active or idle on a network access point ID because of its radio or modem by virtue of the fact that it is a mobile device. The network access point ID the SET is active or idle on is obtained by the modem (radio) on the SET and is made available to the SUPL state machine.

At 640, the terminal can compare the network access point ID that the terminal is active or idle on with the list of Area IDs to determine if the terminal is inside the D-SLP. Continuing with the example in FIG. 3, SET 112 can compare the Area IDs contained in Area ID List 2, which is received in block 630, with the ID associated with network access point ID 24.

In some embodiments, the terminal is implemented by the system 250. In such embodiments, at least portions of 640 may be performed, for example, by the transceiver 252—e.g., in combination with the modulator 280—and/or one or more of the processors 238, 260, and 270—e.g., in combination with information and/or instructions from the data source 236 and/or memory 272. In some embodiments, the D/H-SLP is implemented by the system 210. In such embodiments, at least portions of 640 may be performed, for example, by the transceiver 222—e.g., in combination with the demodulator 240—and/or one or more of the processors 214, 220, 230, and 242—e.g., in combination with information and/or instructions from the data source 212 and/or memory 232.

At 650, the terminal can make a D-SLP use determination based on the comparison. Furthermore, blocks 420, 420A, 420B and 420C in FIGS. 4A and 4B illustrate an example of the determination process according to some embodiments.

In one instance, when the comparison results in active/idle network access point id being in the list of Area IDs that are inside the D-SLP service area, the terminal may determine to use the D-SLP service. In another instance, when the comparison results in the active/idle network access point id not being in the list of Area IDs that are inside or on the border of the D-SLP service area, the terminal may determine, without engaging in precise positioning, to not use the D-SLP service. In yet another instance, when the comparison results in the active/idle network access point id being in the list of Area IDs that are on the border of D-SLP service area, the terminal may be required to engage in precise positioning to accurately determine whether or not to use the D-SLP service.

For example, in the embodiment illustrated in FIG. 3, since the Area ID of the terminal (e.g., CI 24) is contained in the list of Area IDs received in block 630 (e.g., Area ID List 2), SET 112 can determine that it is positioned inside the D-SLP 308. This determination can be based on that all Area IDs in the Area ID List 2 are contained inside the D-SLP service area 308. Therefore, since it can be determined that SET 112 is inside the D-SLP service area 308, SET 112 may use the service of D-SLP 132 without engaging in precise positioning.

According to another embodiment, the terminal can receive a second group of Area IDs which correspond to Area IDs that are on the border of the D-SLP service area.

V. Mobile Device (e.g., SET) and Server (e.g., H-SLP, D-SLP)

Figure 7:
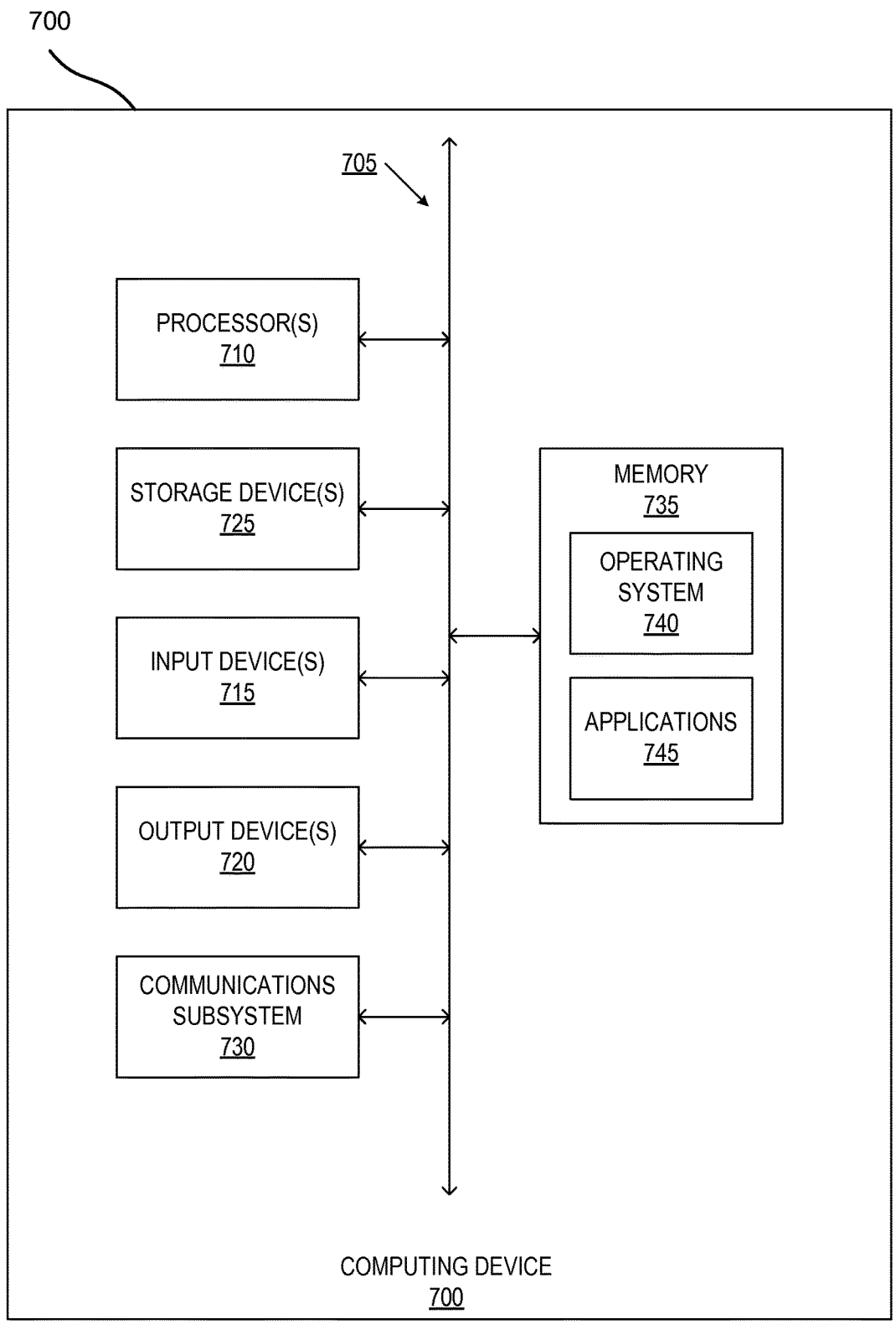
FIG. 7 is one potential implementation of a computer device according to some embodiments.

An example of a computing system in which various aspects of the disclosure may be implemented is now described with respect to FIG. 7. The computing system may exemplify any of SET 112, SET 116, SET 122, D-SLP 132, D-SLP 134 and H-SLP 142 in FIG. 1B and as referenced herein elsewhere. According to one or more aspects, a computer system as illustrated in FIG. 7 may be incorporated as part of a computing device, which may implement, perform, anchor execute any and/or all of the features, methods, and/or method steps described herein. For example, computer system 700 may represent some of the components of a hand-held device. A hand-held device may be any computing device with an input sensory unit, such as a camera and/or a display unit. Examples of a hand-held device include but are not limited to video game consoles, tablets, smart phones, and mobile devices. In one embodiment, the system 700 is configured to implement the device 200 described above. FIG. 7 provides a schematic illustration of one embodiment of a computer system 700 that can perform the methods provided by various other embodiments, as described herein, and/or can function as the host computer system, a remote kiosk/terminal, a point-of-sale device, a mobile device, a set-top box, and/or a computer system. FIG. 7 is meant only to provide a generalized illustration of various components, any and/or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). In one embodiment, the bus 705 can be used for the processor 230 to communicate between cores and/or with the memory 232.

The hardware elements may include one or more processors 710 (e.g., processor 230, TX data processor 214, TX MIMO processor 220, RX data processor 242), including without limitation one or more general-purpose processors and/or one or more special-purpose processors (such as digital signal processing chips, graphics acceleration processors, and/or the like); one or more input devices 715, which can include without limitation a camera, a mouse, a keyboard and/or the like; and one or more output devices 720, which can include without limitation a display unit, a printer and/or the like.

The computer system 700 may further include (and/or be in communication with) one or more non-transitory storage devices 725, which can comprise, without limitation, local and/or network accessible storage, and/or can include, without limitation, memory 232, memory 272, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. According to one embodiment of the present invention, the transmitter 222 and receiver 254 can be examples of a communication subsystem 730. The communications subsystem 930 may permit data to be exchanged with a network (such as the network described below, to name one example), other computer systems, and/or any other devices described herein. In many embodiments, the computer system 700 may further comprise non-transitory working memory 735, which can include a RAM or ROM device, as described above. According to one embodiment of the present invention, the memory 232 and the memory 272 can be examples of a non-transitory working memory 735.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIGS. 4A, 4B, 5A, 5B and 6, might be implemented as code and/or instructions executable by a computer (and/or a processor within a computer); in an aspect, then, such code and/or instructions can be used to configure and/or adapt a general purpose computer (or other device) to perform one or more operations in accordance with the described methods. For example the list of Area IDs 150 can be stored in working memory 735.

A set of these instructions and/or codes might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein, for example one or more of the elements of the method described with respect to FIG. 3.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705 as well as the various components of the communications subsystem 730 (and/or the media by which the communications subsystem 730 provides communication with other devices). Hence, transmission media can also take the form of waves (including without limitation radio, acoustic and/or light waves, such as those generated during radio-wave and infrared data communications). According to some embodiments, the H-SLP 142, SET 112, and/or D-SLP 132 can utilize a communication subsystem 730 to communicate with each other.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above may also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

What is claimed is:
1. A method for determining whether a terminal is located inside a discovered Secure User Plane Location Platform (D-SLP) service area, the method comprising:
 identifying a D-SLP;
 receiving, at the terminal, from a home Secure User Plane Location Platform (H-SLP) an authorization to use the D-SLP;
 receiving, at the terminal from the H-SLP, a list of Area IDs within a Secure User Plane Location Platform (SLP) service area;
 comparing an ID associated with a network access point for the terminal with the list of Area IDs;
 in response to determining that the terminal is on a border of the D-SLP service area, determining a location of the terminal using Global Navigation Satellite System (GNSS) positioning; and determining, using the determined location, that the terminal is inside the border of the D-SLP service area or outside the border of the D-SLP service area;

in response to determining that the ID associated with the network access point for the terminal is inside the border of the D-SLP service area, making a determination to use the D-SLP; and in response to determining that the ID associated with the network access point for the terminal is outside the border of the D-SLP service area, making a determination to not use the D-SLP.

2. The method of claim 1, wherein the ID associated with the network access point for the terminal includes a cell, sector, or access point ID that the terminal is active or idle on.

3. The method of claim 1,
further comprising:
making a determination to use the D-SLP, in response to determining that the ID associated with the network access point for the terminal is included in a first group of Area IDs in the list of Area IDs.

4. The method of claim 3,
wherein the list of Area IDs further comprises a second group of Area IDs on the border of the D-SLP service area, and
wherein determining that the terminal is on the border of the D-SLP service area comprises determining that the ID associated with the network access point is included in the second group of Area IDs.

5. The method of claim 4, further comprising:
making a determination to use the D-SLP based, at least in part, on the location of the terminal, as determined using the GNSS positioning, being inside the D-SLP service area.

6. The method of claim 4, further comprising:
making a determination to not use the D-SLP, in response to determining that the ID associated with the network access point for the terminal is not included in either the first group or the second group of Area IDs.

7. The method of claim 1, wherein the list of Area IDs are received using a SUPL END message.

8. The method of claim 1, wherein a determination regarding whether position of the terminal is inside, outside, or on the border of the D-SLP service area is repeated until a predetermined trigger, wherein the predetermined trigger causes the terminal to stop using the D-SLP.

9. The method of claim 8, wherein if the predetermined trigger occurs, the terminal must receive a second authorization from the H-SLP for further access to the D-SLP.

10. The method of claim 8, wherein the predetermined trigger is based, at least in part, on ending a service privilege of the terminal with the D-SLP.

11. The method of claim 10, wherein the ending of the service privilege is based, at least in part, on an end of a time period, an end of a certain use of time, a threshold number of hours used, or a withdrawal of service message from the H-SLP.

12. A terminal comprising:
one or more processors; and
memory storing computer-readable instructions that, when executed by the one or more processors, cause the terminal to:
identify a discovered Secure User Plane Location Platform (D-SLP);
receive, at the terminal, from a home Secure User Plane Location Platform (H-SLP) an authorization to use the D-SLP;
receive at the terminal from the H-SLP, a list of Area IDs within a Secure User Plane Location Platform (SLP) service area;
compare an ID associated with a network access point for the terminal with the list of Area IDs;
in response to determining that the terminal is on a border of the D-SLP service area, determine a location of the terminal using GNSS positioning; and
determine, using the determined location, that the terminal is inside the border of the D-SLP service area or outside the border of the D-SLP service area;
in response to determining that the ID associated with the network access point for the terminal is inside the border of the D-SLP service area, make a determination to use the D-SLP; and
in response to determining that the ID associated with the network access point for the terminal is outside the border of the D-SLP service area, make a determination to not use the D-SLP.

13. The terminal of claim 12, wherein the ID associated with the network access point for the terminal includes a cell, sector, or access point ID that the terminal is active or idle on.

14. The terminal of claim 12, further comprising computer-instructions that, when executed by the one or more processors, cause the terminal to:
make a determination to use the D-SLP, in response to determining that the ID associated with the network access point for the terminal is included in a first group of Area IDs in the list of Area IDs.

15. The terminal of claim 14,
wherein the list of Area IDs further comprises a second group of Area IDs on the border of the D-SLP service area, and
wherein determining that the terminal is on the border of the D-SLP service area comprises determining that the ID associated with the network access point is included in the second group of Area IDs.

16. The terminal of claim 15, further comprising computer-readable instructions that, when executed by the one or more processors, cause the terminal to:
make a determination to use the D-SLP based, at least in part, on the location of the terminal, as determined by the GNSS positioning, being inside the D-SLP service area.

17. The terminal of claim 15, further comprising computer-readable instructions that, when executed by the one or more processors, cause the terminal to:
make a determination to not use the D-SLP, in response to determining that the ID associated with the network access point for the terminal is not included in either the first group or the second group of Area IDs.

18. The terminal of claim 12, wherein the list of Area IDs are received using a SUPL END message.

19. The terminal of claim 12, wherein a determination regarding whether the position of the terminal is inside, outside, or on the border of the D-SLP service area is repeated until a predetermined trigger, wherein the predetermined trigger causes the terminal to stop using the D-SLP.

20. The terminal of claim 19, wherein if the predetermined trigger occurs, the terminal must receive a second authorization from the H-SLP for further access to the D-SLP.

21. The terminal of claim 19, wherein the predetermined trigger is based, at least in part, on ending a service privilege of the terminal with the D-SLP.

22. The terminal of claim 21, wherein the ending of the service privilege is based, at least in part, on an end of a time period, an end of a certain use of time, a threshold number of hours used, or a withdrawal of service message from the H-SLP.

23. One or more non-transitory computer-readable media storing computer-executable instructions for determining whether a terminal is located inside a discovered Secure User Plane Location Platform (D-SLP) service area that, when executed, cause one or more computing devices included in the terminal to:
identify a D-SLP;
receive, at the terminal, from a home Secure User Plane Location Platform (H-SLP) an authorization to use the D-SLP;
receive at the terminal from the H-SLP, a list of Area IDs within a Secure User Plane Location Platform (SLP) service area;
compare an ID associated with a network access point for the terminal with the list of Area IDs;
in response to determining that the terminal is on a border of the D-SLP service area, determine a location of the terminal using GNSS positioning; and
determine, using the determined location, that the terminal is inside the border of the D-SLP service area or outside the border of the D-SLP service area;
in response to determining that the ID associated with the network access point for the terminal is inside the border of the D-SLP service area, make a determination to use the D-SLP; and
in response to determining that the ID associated with the network access point for the terminal is outside the border of the D-SLP service area, make a determination to not use the D-SLP.

24. An apparatus for determining whether a terminal is located inside a discovered Secure User Plane Location Platform (D-SLP) service area, the apparatus comprising:
means for identifying a D-SLP;
means for receiving, at the terminal, from a home Secure User Plane Location Platform (H-SLP) an authorization to use the D-SLP;
means for receiving at the terminal from the H-SLP, a list of Area IDs within a Secure User Plane Location Platform (SLP) service area;
means for comparing an ID associated with a network access point for the terminal with the list of Area IDs;
in response to determining that the terminal is on a border of the D-SLP service area, determining a location of the terminal using GNSS positioning; and
determining, using the determined location, that the terminal is inside the border of the D-SLP service area or outside the border of the D-SLP service area;
in response to determining that the ID associated with the network access point for the terminal is inside the border of the D-SLP service area, making a determination to use the D-SLP; and
in response to determining that the ID associated with the network access point for the terminal is outside the border of the D-SLP service area, making a determination to not use the D-SLP.

25. The apparatus of claim 24, wherein the ID associated with the network access point for the terminal includes a cell, sector, or access point ID that the terminal is active or idle on.

26. The apparatus of claim 24, further comprising:
means for making a determination to use the D-SLP, in response to determining that the ID associated with the network access point for the terminal is included in a first group of Area IDs in the list of Area IDs.

27. The apparatus of claim 26,
wherein the list of Area IDs further comprises a second group of Area IDs on the border of the D-SLP service area, and
wherein determining that the terminal is on the border of the D-SLP service area comprises determining that the ID associated with the network access point is included in the second group of Area IDs.

28. The apparatus of claim 27, further comprising:
means for making a determination to use the D-SLP based, at least in part, on the location of the terminal, as determined using the GNSS positioning, being inside the D-SLP service area.

29. The apparatus of claim 27, further comprising:
means for making a determination is to not use the D-SLP, in response to determining that the ID associated with the network access point for the terminal is not included in either the first group or the second group of Area IDs.

30. The apparatus of claim 24, wherein the list of Area IDs are received using a SUPL END message.

31. The apparatus of claim 24, wherein a determination regarding whether position of the terminal is inside, outside, or on the border of the D-SLP service area is repeated until a predetermined trigger, wherein the predetermined trigger causes the terminal to stop using the D-SLP.

32. The apparatus of claim 31, wherein if the predetermined trigger occurs, the terminal must receive a second authorization from the H-SLP for further access to the D-SLP.

33. The apparatus of claim 31, wherein the predetermined trigger is based, at least in part, on ending a service privilege of the terminal with the D-SLP.

34. The apparatus of claim 33, wherein the ending of the service privilege is based, at least in part, on an end of a time period, an end of a certain use of time, a threshold number of hours used, or a withdrawal of service message from the H-SLP.

* * * * *